United States Patent
Pearson et al.

(10) Patent No.: US 9,083,566 B1
(45) Date of Patent: Jul. 14, 2015

(54) SYSTEM AND METHOD FOR COMMUNICATING WITH AN APPLET USING AN INLINE WEB FRAME IN A NETWORK ENVIRONMENT

(75) Inventors: Alan Scott Pearson, Seattle, WA (US); Aaron Hyman Averbuch, Seattle, WA (US); Rodney David Smith, Issaquah, WA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 281 days.

(21) Appl. No.: 13/449,517

(22) Filed: Apr. 18, 2012

(51) Int. Cl.
*G06F 17/00* (2006.01)
*H04L 29/00* (2006.01)

(52) U.S. Cl.
CPC ....................................... *H04L 29/00* (2013.01)

(58) Field of Classification Search
CPC ............................ G06F 21/128; G06F 17/2247
See application file for complete search history.

(56) References Cited

U.S. PATENT DOCUMENTS

| | | | |
|---|---|---|---|
| 5,919,247 | A | 7/1999 | Van Hoff et al. |
| 7,260,597 | B1 | 8/2007 | Hofrichter et al. |
| 7,359,933 | B1 | 4/2008 | Polen et al. |
| 8,108,898 | B2 | 1/2012 | Hofrichter et al. |
| 8,285,856 | B1 * | 10/2012 | Jain et al. ....................... 709/228 |
| 2002/0138658 | A1 * | 9/2002 | Sjostrom et al. ............... 709/310 |
| 2004/0103199 | A1 * | 5/2004 | Chao et al. ...................... 709/228 |
| 2006/0101139 | A1 | 5/2006 | Hornreich et al. |
| 2007/0106946 | A1 | 5/2007 | Goetz et al. |
| 2013/0124642 | A1 * | 5/2013 | Bansal et al. .................. 709/206 |

OTHER PUBLICATIONS

U.S. Appl. No. 13/172,615, entitled "An Application Framework in a Home Network Ecosystem," filed Jun. 29, 2011, Inventors: Aaron Averbuch, et al.
Alex Kayla, "Cisco drives smart home networks," Feb. 8, 2012, 3 pages; http://www.itweb.co.za/index.php?option=com_content&view=article&id=51375.

* cited by examiner

*Primary Examiner* — Keith Bloomquist
(74) *Attorney, Agent, or Firm* — Patent Capital Group

(57) ABSTRACT

A method in an example embodiment includes modules for identifying an applet for a local network and providing instructions in a parent container file to enable operations that comprise rendering an inline web frame within a main web page, loading a source file in the inline web frame, adding a callback object to the inline web frame, and loading an interface file of the applet in the inline web frame. In particular, the loaded interface file can be configured to communicate with an entity associated with the local network by invoking the callback object. In specific embodiments, the inline web frame is hidden in the main web page. In more specific embodiments, the callback object contains one or more application programming interfaces (APIs). In further embodiments, the parent container file can include a hypertext markup language (HTML) document.

20 Claims, 5 Drawing Sheets

(12)  United States Patent

SYSTEM AND METHOD FOR COMMUNICATING WITH AN APPLET USING AN INLINE WEB FRAME IN A NETWORK ENVIRONMENT

TECHNICAL FIELD

This disclosure relates in general to the field of network communications and, more particularly, to a system and a method for communicating with an applet using an inline web frame in a network environment.

BACKGROUND

A local network can be configured with a selected group of computing devices in any suitable arrangement, including a local area network (LAN), a wireless local area network (WLAN), a virtual local area network (VLAN), etc. A local network can be configured for various settings (e.g., a home, an office, an enterprise, a vehicle, etc.) with connectivity to external networks and with communication capabilities between the local network's computing devices. For example, a router can be hardwired to a modem to provide a connection between the computing devices of a local network, and between the computing devices and an external network such as the Internet. In addition, many local networks are at least partially wireless in which wireless computing devices communicate with a wireless router via a wireless network interface controller.

Communication with some computing devices in a local network is typically accomplished by software, referred to as a 'device driver', which can be used to configure the computing devices and to act as a translator between the hardware of the computing device and applications or operating systems that use the computing device. Device applications may also provide functionality, which is built on top of such devices in a local network. Additionally, service applications offering network services (e.g., parental controls for devices, device monitoring, etc.) may be provided in a local network and may or may not be associated with a particular computing device.

Device drivers, device applications, and service applications can be associated with numerous different providers, including third party vendors. Consequently, managing the different drivers and applications in a local network can require a significant amount of diligence by a user to access each computing device, and service to receive notifications, updates, or other messages. Hence, local networks need to be configured to facilitate communication between their computing devices and/or services, and users that manage these components.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in an example embodiment includes identifying an applet for a local network. In such a context, the term 'identifying' includes any activity associated with evaluating, analyzing, flagging, or otherwise processing the applet. The method also includes providing instructions in a parent container file to enable operations that comprise: rendering an inline web frame within a main web page, loading a source file in the inline web frame, adding a callback object to the inline web frame, and loading an interface file of the applet in the inline web frame.

In more particular embodiments, the loaded interface file can be configured to communicate with an entity associated with the local network by invoking the callback object. In further embodiments, the inline web frame is hidden in the main web page. In yet other specific embodiments, the callback object contains one or more application programming interfaces (APIs). In even more specific embodiments, the method includes receiving a communication from the loaded interface file, generating instructions to display a notification on at least one computing device connected to the local network, and communicating the instructions to the local network. The parent container file can include a hypertext markup language (HTML) document in certain example configurations.

Example Embodiments

Figure 1:
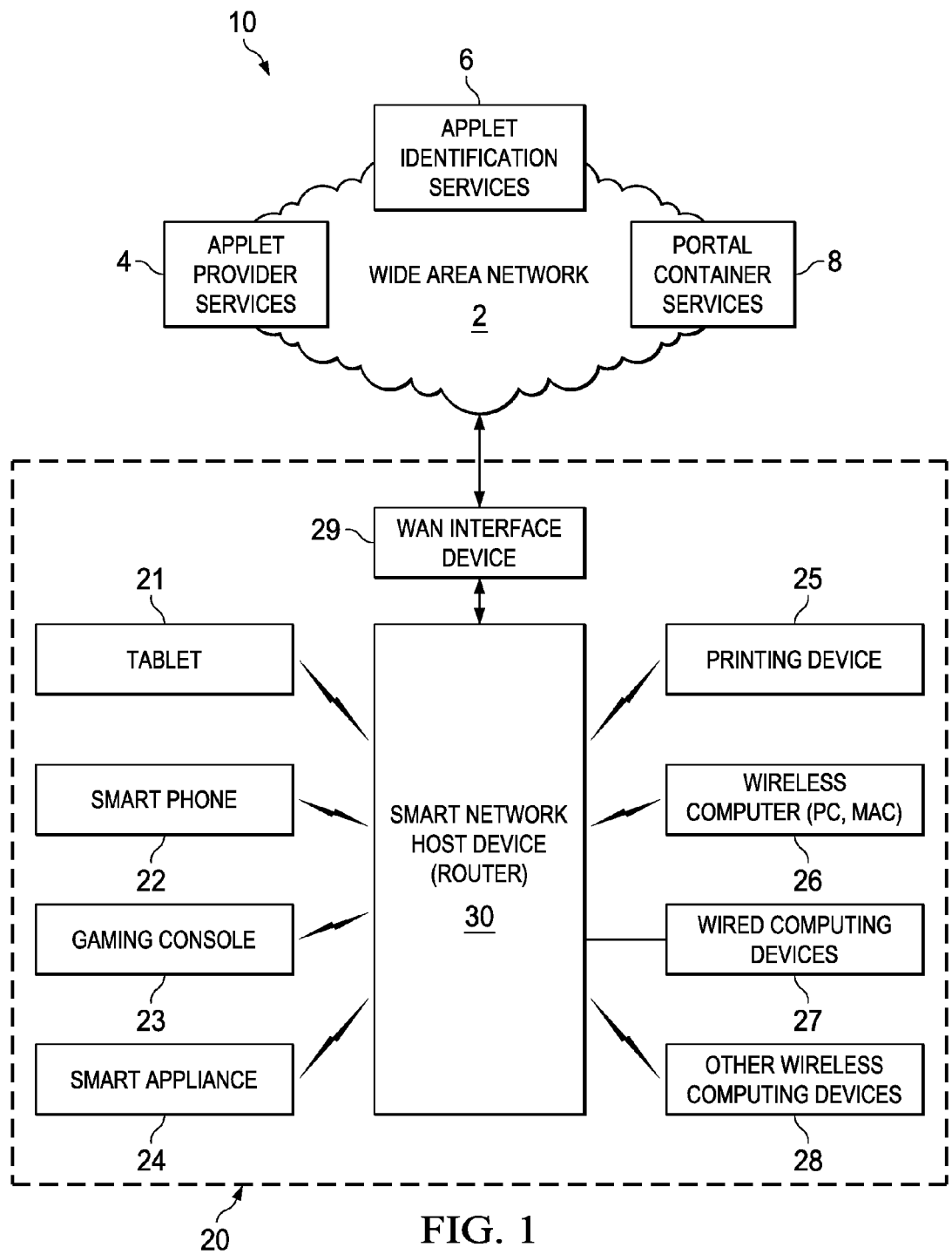
FIG. 1 is a simplified block diagram of an example network environment in which a system for communicating with an applet using an inline web frame can be implemented in accordance with embodiments of the present disclosure.

FIG. 1 is a simplified block diagram of a network environment 10 in which a system for communicating with an applet using an inline web frame can be implemented. In network environment 10, an exemplary local network 20 (e.g., a home network) is illustrated and includes a smart network host device 30, such as a router, a switch, a gateway, or a proprietary device that facilitates communications between various types of computing devices. The computing devices depicted in FIG. 1 include a tablet 21, a smart phone 22, a gaming console 23, a smart appliance 24, a printing device 25, and a wireless computer 26. In addition, any other suitable type of wired or wireless computing devices may be connected to smart network host device 30, as depicted by wired computing devices 27 and other wireless computing devices 28. Smart network host device 30 can also facilitate communication between local network 20 and external networks such as wide area network (WAN) 2 (also referred to herein as a 'cloud'), via a WAN interface device 29. Various services associated with the system for communicating with an applet using an inline web frame may be in the cloud, including applet provider services 4, applet identification services 6, and portal container services 8. These services 4, 6, and 8 can be implemented in any suitable configuration of computing devices and network elements.

Network environment 10 in FIG. 1 represents a series of points or nodes of interconnected communication paths for receiving and transmitting packets of information that propagate through network environment 10. Additionally, network environment 10 offers communicative interfaces between network elements and computing devices. Network environment 10 can include any local area network (LAN), wireless local area network (WLAN), metropolitan area network (MAN), Intranet, Extranet, wide area network (e.g., WAN 2), virtual local area network (VLAN), virtual private network (VPN), or any other appropriate architecture or system that facilitates communications in a network environment.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Network environment 10 may include a configuration capable of transmission control protocol/Internet protocol (TCP/IP) communications for the electronic transmission or reception of packets in a network. Network environment 10 may also operate in conjunction with a user datagram protocol/IP (UDP/IP) or any other suitable protocol, where appropriate and based on particular needs.

Certain terminologies are used herein with regard to the various embodiments of the present disclosure. The term 'link' as used herein, encompasses a physical or logical communications channel (e.g., a physical transmission medium such as a wire or cable, or a logical transmission medium such as a radio channel) that connects two or more communicating devices. The term 'data' as used herein, refers to any type of numeric, voice, video, or script data, or any type of source or object code, or any other suitable information in any appropriate format that may be communicated from one point to another in electronic devices (e.g., computing devices, network elements) and/or networks.

Note that in this Specification, references to various features (e.g., elements, structures, modules, components, steps, operations, characteristics, etc.) included in 'one embodiment', 'example embodiment', 'an embodiment', 'another embodiment', 'some embodiments', 'various embodiments', 'other embodiments', 'alternative embodiment', etc. are intended to mean that any such features are included in one or more embodiments of the present disclosure, but may or may not necessarily be combined in the same embodiments.

For purposes of illustrating the operational aspects of a system for communicating with an applet using an inline web frame, it is important to understand the communications that may be traversing network environment 10 and the problems that may be present in operational scenarios transpiring in network environment 10. The following foundational information may be viewed as a basis from which the present disclosure may be properly explained. Such information is offered for purposes of explanation only and, accordingly, should not be construed in any way to limit the broad scope of the present disclosure and its potential applications.

In a typical local network, a network element such as a router connects the local network to other networks (e.g., the Internet) and forwards data packets to the other networks or to computing devices in the local network. A local network can include numerous types of computing devices (e.g., printers, laptops, personal computers, smart phones, tablets, gaming consoles, etc.), which can be associated with any number of different vendors. Certain computing devices (e.g., hardware devices such as printers, scanners, smart appliances, etc.) are generally configured with software, often referred to as 'device drivers' or 'software drivers', provided by their corresponding vendors. A device driver can display information about, and provide logic to configure a device. Device applications may also be offered by vendors to expose device-specific functionality built on top of a computing device. These device drivers and device applications are referred to herein as 'device applets.'

Service applications can include software, which handles the display and execution of tasks in a local network. Additionally, service applications may or may not be tied to particular computing devices on a local network and may be offered by various vendors to provide additional services on a local network. These service applications are referred to herein as 'service applets' and may operate on multiple devices or provide actions or information to a user. The more general reference to 'applet' is intended to include both device and service applets.

Generally in a local network, device applets and service applets are installed and managed separately by a user. The applets are often initially downloaded by the user, and any subsequent updates may also be separately downloaded by the user. Different vendors can employ different notification techniques for new releases, versions, patches, etc. In addition, service and device applets can provide a wide range of functionality with various types of communications and various implementations to provide those communications to a user. Consequently, as more applets are added to a local network, more effort is generally required by a user to effectively manage and access the applets.

A framework that provides a user interface in a local network for hosting applets can solve some of these problems. For example, certain Home Network Ecosystems can provide for populating a user interface with appropriate applications based on the characteristics of the particular client devices in the home network. While this may alleviate the difficulty in keeping the home network and its client devices up to date with the newest applet releases or versions, the applets may still communicate to a user separately and the user may need to separately load and execute each applet to access that applet and receive pertinent communications.

Because a local network could have any number of applets provided by different vendors or providers, it is also desirable to protect the code of the framework for hosting the applets from the applets themselves. In one example, a user interface can be configured to enable an applet that includes hypertext markup language (HTML), cascading style sheet (CSS), and JavaScript code to be launched by a user and displayed in an inline web frame (e.g., inline frame (iFrame)) of a main web page of the user interface. The applet's JavaScript code can then be allowed to run in the iFrame without accessing the main web page.

An iFrame is an HTML element that places another HTML document in an inline frame that sits in a parent or main HTML page. A sandbox is created by an iFrame to prevent the contents of the iFrame from communicating with the main HTML page. IFrames are often used by websites to load a web page from another site to display advertisements (e.g., banner ads, animated images, Flash content, etc.). Web browsers that load plug-ins or applets (e.g., Adobe Flash or QuickTime) into the browser often use iFrames to give a region of a web page to the plug-in or applet for its own display.

Although iFrames provide a useful mechanism for hosting applets by a user interface, when an applet is not running, the applet may still need to communicate with a user to notify the user regarding state changes to a software or hardware entity associated with the local network (e.g., printer is low on ink, refrigerator needs a new filter, another user is trying to initiate a chat session via a chat utility applet, a certain device has come online or has gone offline in the local network, a certain applet needs to be updated, etc.). A state change can include any change related to an entity's properties or characteristics. Accordingly, a technique by which an applet can communicate with a user even when the applet is not visible or fully loaded and executing, and without interfering with a user interface that hosts the applet, is needed.

Embodiments of the present disclosure can resolve many of these issues (and potentially others) in offering a system for communicating with an applet using an inline web frame, which includes a portal container application with a user interface. FIG. 1 illustrates one embodiment in which cloud services (e.g., portal container services 8, applet provider services 4, and applet identification services 6) provide a framework for hosting device and/or service applets that can be displayed and executed in inline web frames of a user interface accessed remotely or locally by a computing device of local network 20. The system can create a separate inline web frame, which can be hidden or not visible to a user, in a main web page for each applet associated with the local network, if the applet has a corresponding interface file. The hidden inline web frames can be configured to facilitate communication between an interface file of each applet and other hardware and software entities, including the portal container application, using callback objects injected into the inline web frame. More specifically, the system enables an applet to communicate with its parent container or main web page even when a main user interface of the applet is not visible or loaded, by using an inline web frame that is pre-populated with a callback object exposing an application programming interface (API) that is available from the main web page.

Figure 2:
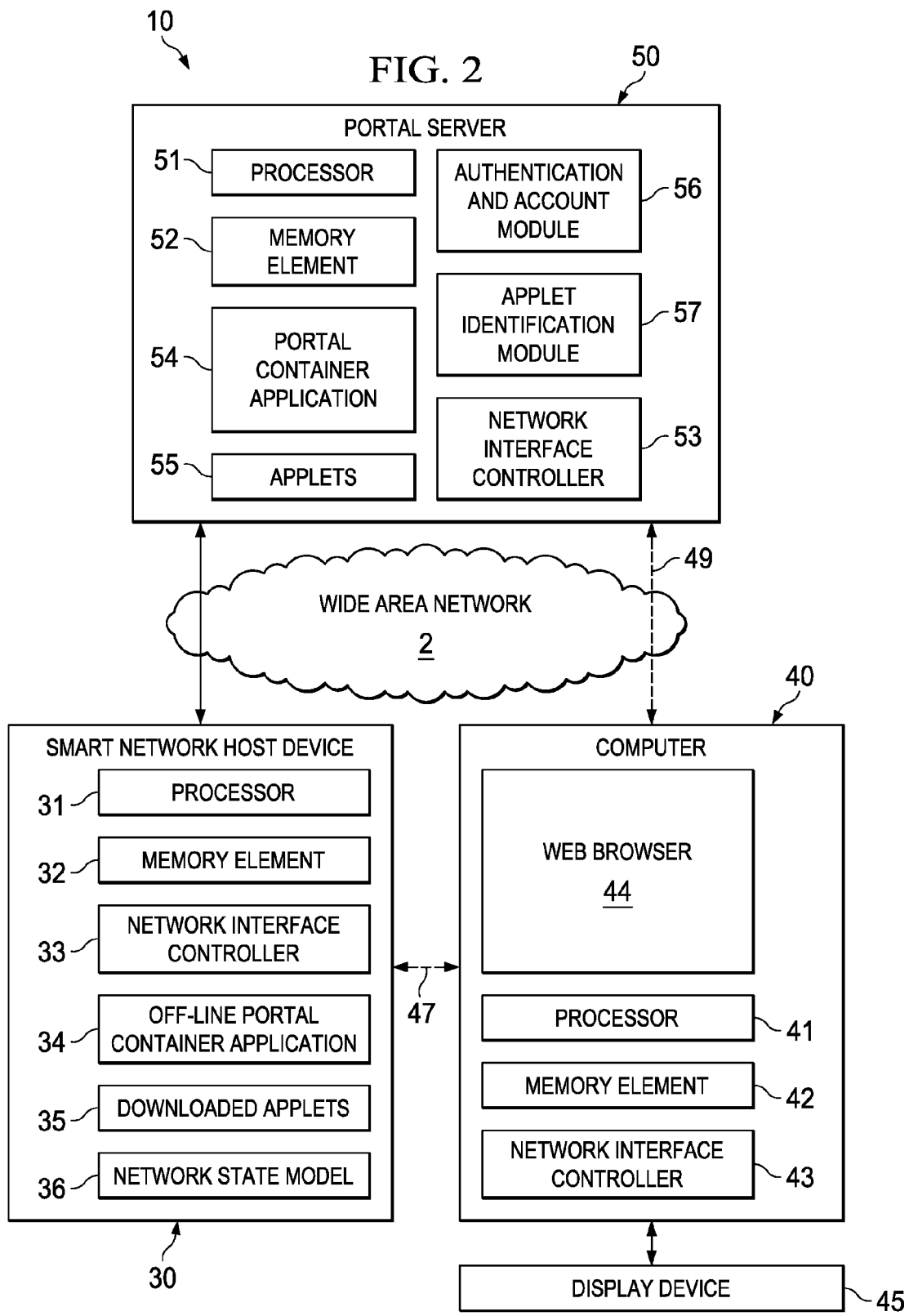
FIG. 2 is a simplified block diagram showing additional details of components configured to implement the system of FIG. 1.

Turning to FIG. 2, FIG. 2 is a simplified block diagram illustrating one possible set of details associated with network environment 10. A portal server 50 is provided in the cloud (e.g., WAN 2) and can be configured to provide applet provider services 4, applet identification services 6, and portal container services 8 of network environment 10. As shown in the example embodiment shown in FIG. 2, these services 4, 6, and 8 can be combined and provided by portal server 50, which can include a processor 51, a memory element 52, a network interface controller 53, a portal container application 54, applets 55, an authentication and account module 56, and an applet identification module 57. In other embodiments, services 4, 6, and 8 could be deployed in other suitable arrangements, including separate machines for each service or multiple machines for each service.

Smart network host device 30 can include a processor 31, a memory element 32, a network controller interface 33, an off-line portal container application 34, downloaded applets 35, and a network state model 36. Smart network host device 30, which can be configured as a router or a gateway, provides access to external networks such as WAN 2 (e.g., the Internet) and to computing devices of local network 20. In example network environment 10, smart network host device 30 is connected to WAN interface device 29 (e.g., a modem), shown in FIG. 1, which may be connected to WAN 2 by any appropriate medium including, for example, digital subscriber lines (DSL), telephone lines, T1 lines, T3 lines, wireless, satellite, fiber optics, cable, Ethernet, etc. or any suitable combination thereof.

In example embodiments, smart network host device 30 can provide routing capabilities typically implemented by wireless routers to route packets between local network 20 and external networks and between computing devices of local network 20. Wireless capabilities of smart network host device 30 can be implemented using known wireless standards, such as the Institute of Electronics and Electrical Engineers 802.11 standards, for wireless local area networking. Antennas coupled to smart network host device 30 and computing devices, such as computer 40, can be configured to establish wireless links, such as link 47. Smart network host device 30 may also be configured to implement wired connections to one or more computing devices using known standards such as Ethernet. Furthermore, suitable protocols for routing data packets can be implemented including layer 2 switching and layer 3 routing. Other services and protocols such as dynamic host configuration protocol (DHCP), network address translation (NAT), etc. may also be implemented in smart network host device 30.

Network state model 36 of smart network host device 30 represents different entities and related services operating within local network 20. For example, if a computing device connected to smart network host device 30 implements a printer with a scanner and flash memory reader, then network state model 36 could include an entry for the computing device and related attributes for a printer service, scanner service, and file (or block device) service. In addition, new devices can register with smart network host device 30, which then updates network state model 36 to include the new device.

Off-line portal container application 34 and downloaded applets 35 can be provided on smart network host device 30 to enable computer 40 to access a local off-line version of portal container application 54 even when external network access is unavailable. While certain functionalities of some applets may not be possible without an external network connection, other applets that provide services or device functionalities contained within local network 20 can be enabled through off-line portal container application 34. Downloaded applets 35 of smart network host device 30 can include applets previously identified and downloaded from portal server 50, for example, when portal container application 54 was previously launched. In certain embodiments, applets that require connectivity to an external network to properly function may not be included in downloaded applets 35.

Computer 40 represents any computing device of local network 20 that may be used to launch portal container application 54 for hosting device and service applets associated with local network 20. Such devices may typically include, for example, wireless (or wired) computer 26, smart phone 22, or tablet 21. Other computing devices may also be used if they have suitable processing, memory, and display components (e.g., a smart appliance with an embedded tablet) in addition to web browser capabilities. Computer 40 can include a processor 41, a memory element 42, a network interface controller 43, and a web browser 44. Web browser 44 could be a known web browser commonly deployed on personal computers or Macintosh computers that typically operate in a client/server model. Web browser 44 is capable of contacting web servers, requesting information or resources, receiving the requested information or resources, and interpreting and displaying received parent container files (e.g., HTML documents). A parent container file is a file created by portal container application 54 using a markup language, such as HTML, to create a main web page and one or more hidden inline web frames within the main web page. A parent container file can be, for example, an HTML document. Examples of web browser 44 include, but are not limited to, Microsoft® Internet Explorer® software, Netscape Navigator® software, Mozilla® Firefox® software, Google Chrome™ software, Apple® Safari® software, etc.

Computer 40 can also be configured with a display device 45. Display device 45 could include a separate computer monitor or an integrated display screen with any appropriate input mechanism (e.g., a keyboard, a touch screen, a mouse, a touchpad, a trackball, audio input devices, etc.). Display device 45 may also be capable of presenting a user interface, which could be a graphical user interface (GUI) created by software.

In embodiments of the present disclosure, computer 40 can launch portal container application 54 remotely or locally from local network 20. Computer 40 could access portal server 50 from local network 20 via smart network host device 30, as indicated by link 47, which could be a wired or wireless link. Alternatively, computer 40 could access portal server 50 remotely, as indicated by link 49, which could include any available communication pathway that includes wireless links, wired links, other networks, or any suitable combination thereof.

Portal container application 54 and associated modules can be configured to be deployed on any computing device hosting a web browser (e.g., computer 40). In particular, portal container application 54 could be configured as a native application implemented directly on computer 40 that can download and update applets from various applet providers in the cloud and generate a user interface on computer 40. In certain implementations, a native application that provides applet identification services and portal container services could potentially improve the user experience on computing devices that utilize radio transmission technologies that could have undesirable transmission rates when downloading data from the Internet (e.g., mobile telecommunication technologies such as 3G, 3GPP Long Term Evolution, 4G, etc.). Accordingly, it may be desirable for a native application to be deployed in handheld devices and mobile devices such as smart phones and tablets.

In various implementations, smart network host device 30, computer 40, and portal server 50 can include software to achieve (or to foster) the applet communication operations, as outlined herein. Note that in one example, each of these elements can have an internal structure (e.g., processors 31, 41, 51, memory elements 32, 42, 52, network interface controllers 33, 43, 53, etc.) to facilitate some of the operations described herein. For example, one or more of network interface controllers 33, 43, and 53 may be wireless network interface controllers to enable wireless communication between these elements. In other embodiments, these applet communication operations may be executed externally to these elements, or included in some other network element to achieve this intended functionality. Alternatively, smart network host device 30, computer 40, and/or portal server 50 may include this software (or reciprocating software) that can coordinate with other network elements in order to achieve the operations, as outlined herein. In still other embodiments, the computing devices and network elements may include any suitable algorithms, hardware, software, components, modules, interfaces, or objects that facilitate the operations thereof.

In operational terms, portal container application 54 creates a restricted execution environment, or sandbox, for applets that run in local network 20, and enables selected communication capabilities for each applet to access other entities associated with the local network when the applet is idle (i.e., not fully loaded and executing). Portal container application 54 can provide a user interface on a computing device, such as computer 40, for the applets, which can be obtained from any applet provider. Authentication and account module 56 allows a user of computer 40 to log into a website hosting the portal container application and authenticate to an account for local network 20. Any suitable authentication techniques may be employed (e.g., user identification and password, etc.). Computer 40 can log in to the website that hosts portal container application 54 from local network 20 via smart network host device 30, or remotely from another access point (e.g., a router in another local network, a router in a public network, a modem, etc.).

If computer 40 establishes a connection to portal server 50 from local network 20 and is authenticated, then a connection between portal container application 54 and smart network host device 30 has already been established. If computer 40 establishes a connection to portal server 50 from a remote network and is authenticated, then authentication and account module 56 can provide location information (e.g., a network address) of smart network host device 30. For example, a network address of smart network host device 30 may be stored in an account associated with local network 20. A connection can then be established to smart network host device 30, thereby facilitating communication between computer 40 and other computing devices in local network 20, with portal container application 54 generating a user interface for the applets on remote computer 40.

When a user logs on to the website of portal server 50 through computer 40 (locally or remotely), in one embodiment, smart network host device 30 provides information from network state model 36 regarding the types of computing devices and other network elements configured in local network 20 (e.g., the type of routers, computers, printers, scanners, card readers, gaming consoles, tablets, smart phones, etc.), including any that have been recently added. Applet identification module 57 then iterates a list of applets to be downloaded and/or updated for the identified local network 20 to which computer 40 is connected. For example, when a new device has joined local network 20, applets that are identified to download could include a device applet required to view and manage the new device, service applets that the new device supports, and version updates to existing applets.

Applets 55 can be in the form of a repository of applets or an 'applet store' that contains the applets to be downloaded to local network 20. Applets 55 may be provided by the provider controlling portal container application 54 or by third parties who create their own code for their specific devices or services for local networks. Additionally, each applet is identified by a universally unique identifier (UUID), also referred to herein as 'applet ID', which can be generated when the applet is created. Applets 55 identified and downloaded for a particular local network 20 can include both device and service applets, and can include applets that are associated with computing devices in the local network, applets that a user has purchased, applets that have been published and offered without cost that a user has selected, or applets that have been automatically identified and selected for the particular network.

Portal container application 54 can create a hidden web frame within a main web page (or parent page) by generating a portal container file with appropriate instructions. The portal container file could be created in HTML (e.g., HTML document) or another suitable markup language with instructions for rendering a main web page (e.g., main HTML page) with hidden inline web frames (e.g., iFrames). For ease of reference, descriptions herein may specifically refer to HTML documents, iFrames, main HTML pages, and JavaScript to illustrate example implementations of portal container files, inline web frames, web pages, and a scripting language, respectively, in embodiments of the present disclosure.

A separate hidden iFrame is created for each identified applet that is configured to interface with other entities (i.e., devices and/or applications) associated with local network 20 without being fully loaded. Portal container application 54 configures a hidden iFrame such that code (e.g., a callback object) can be injected into the hidden iFrame to enable an applet (or a portion thereof) that is running in the hidden iFrame to communicate with other entities such as the main page, smart network host device 30, portal container application 54, and potentially other devices and/or applications.

To accomplish this, portal container application 54 examines the contents of each identified applet to find the presence of an interface file. In one embodiment, the interface file could be a portion of the applet in the form of a JavaScript file (e.g., 'interface.js'). If the interface file is present in an applet, then portal container application 54 creates an iFrame within the main HTML page of the user interface. An iFrame element is an inline frame used to embed another document within a parent HTML document, and can be created in an HTML document with an <iframe> tag. Cascading Style Sheet (CSS) is essentially a template that applies formatting and style information to an element of a web page. In CSS, a 'DISPLAY' property can be set to 'NONE' for an iFrame, or a 'VISIBILITY' property set to 'HIDDEN', so that it does not appear on a display device when the main HTML page is rendered. The use of the 'DISPLAY:NONE' setting may be desirable because space is not taken up in the main HTML page.

After creating the hidden iFrame in the HTML document, a uniform resource locator (URL) of the hidden iFrame is set to an HTML source file, which causes an HTML page to load into the hidden iFrame when the main HTML page is rendered on a display device (e.g., display device 45 of computer 40). Additionally, an applet ID of the applet associated with the iFrame is passed to the iFrame via the URL of the HTML source file that was set as the URL of the iFrame. In one example embodiment, the applet ID can be appended to the URL as a URL query parameter.

Figure 3:
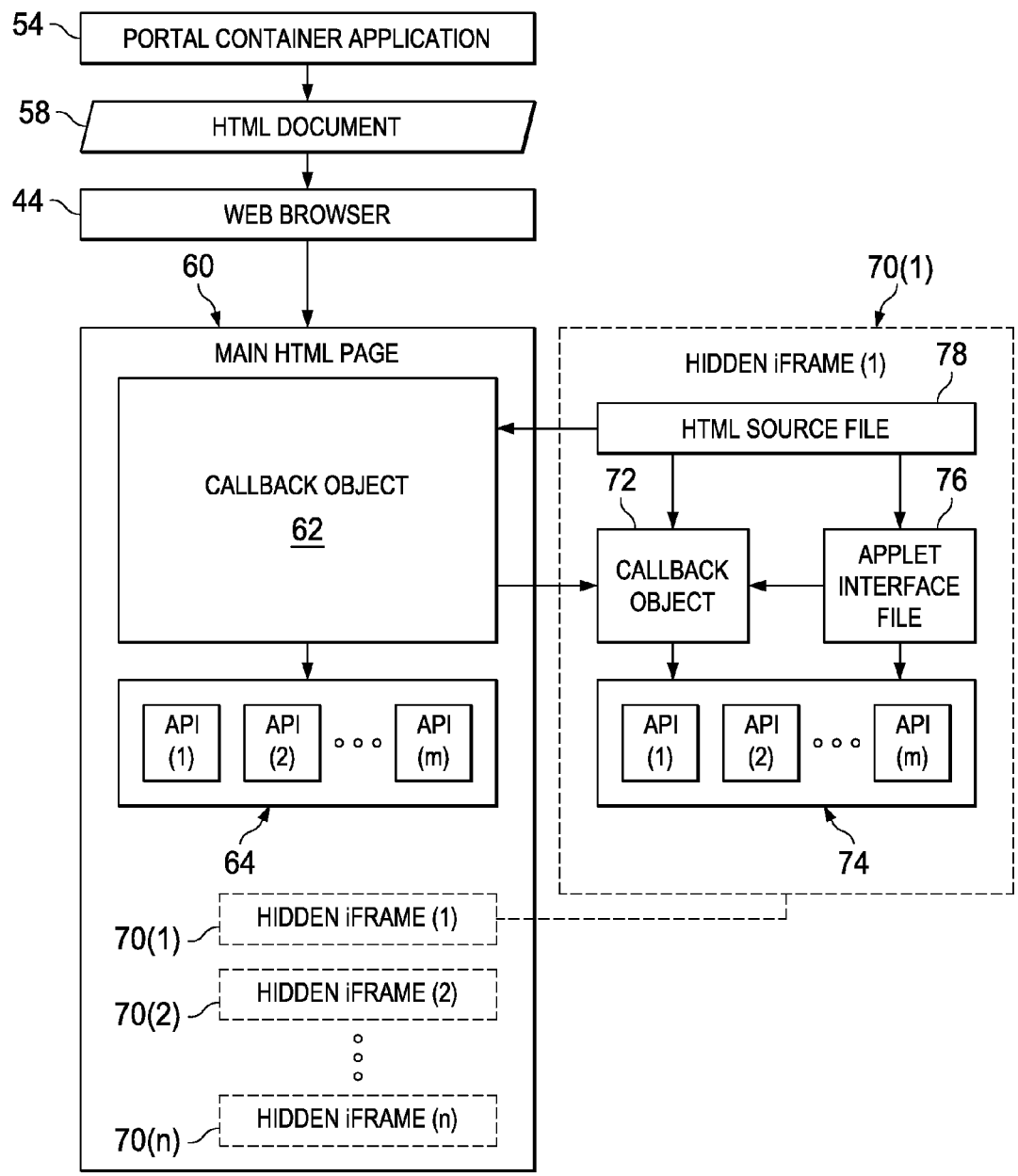
FIG. 3 is a simplified block diagram representing the creation of a main web page, with an exploded view of a hidden inline web frame in accordance with embodiments of the system.

With reference to FIG. 3, FIG. 3 is a block diagram that graphically illustrates the operations that can be performed when a web browser (e.g., web browser 44) interprets an HTML document 58 created by portal application container 54. Web browser 44 can create a window object (i.e., an open window in a browser) for HTML document 58 and an additional window object for each iFrame in HTML document 58. A main page 60 is rendered with hidden iFrames 70(1), 70(2), through 70(n). Each of the hidden iFrames 70(1) through 70(n) is loaded in main page 60 and corresponds to a unique applet that was identified and determined to have interface file by portal container application 54.

A representative exploded view of hidden iFrame 70(1) is illustrated in FIG. 3. An HTML source file 78 is loaded into hidden iFrame 70(1) as a result of the URL of iFrame 70(1) being set to the URL of HTML source file 78 by portal container application 54. HTML source file 78 can be configured to function as a loader file for loading a selected applet. Additionally, main page 60 can be configured to construct a JavaScript object in main page 60, shown as callback object 62, and then to populate the object with callback functions (i.e., a set of methods) such as application program interfaces 64 (APIs) that can execute code on main page 60. A callback object 72 containing APIs 74, which corresponds to callback object 62 containing APIs 64, is added to hidden iFrame 70(1) by main page 60. In one embodiment, callback object 72 can be added to hidden iFrame 70(1) by setting a global variable within hidden iFrame's window object to the callback object.

The injection of callback object 72 into iFrame 70(1) by main page 60 enables iFrame 70(1) to access APIs 74 in order to communicate with devices and/or applications in local network 20. Access to APIs 74 can also enable iFrame 70(1) to communicate outside local network 20, for example, to portal container application 54. Thus, main page 60 effectively makes itself and selected APIs accessible to iFrame 70(1).

Any number of callbacks can be constructed in main page 60 and then added to hidden iFrame 70(1). For example, a single callback as shown in FIG. 3 can be used to call all APIs divulged by main page 60. Alternatively, a different callback object could be associated with each API. In another embodiment, each callback could contain APIs related to a specific type of function (e.g., a callback object containing APIs that communicate with the router, a callback object containing APIs that communicate user interface messages to devices, etc.).

HTML source file 78 can then dynamically load an interface file 76 of the applet associated with iFrame 70(1). If the applet ID has been appended on the URL of the HTML source file as a query parameter, then HTML source file 78 can retrieve the URL query parameter and use the applet ID to locate and dynamically load applet interface file 76 (e.g. 'interface.js' file) of the applet. In one example implementation, this can be accomplished using an Asynchronous JavaScript and XML (AJAX) web development technique to retrieve data from a web server asynchronously (in the background) without interfering with the display and behavior of main page 60. An API, such as XMLHttpRequest (XHR), can be invoked to send HTTP or HTTPS requests directly to a web server and to load the server response data directly back into the script, thus avoiding full page reloads. After invoking the XHR API to load applet interface file 76, a JavaScript eval( ) function can be invoked to execute applet interface file 76. Other JavaScript evaluation techniques may also be used (e.g., JavaScript Object Notation (JSON) parsing with functions, etc.).

In another implementation, a script tag can be dynamically created and added to an HTML Document Object Module (DOM) of the iFrame. The HTML DOM is a World Wide Web Consortium (W3C) standard for accessing HTML documents. It is a platform that allows programs and scripts to dynamically access and update the content, structure, and style of a document.

When applet interface file 76 is loaded and running in hidden iFrame 70(1), the applet is in an idle state. Applet interface file 76 may communicate with parent container application 54 or smart network host device 30, for example, by invoking appropriate methods in callback object 72, thereby allowing applet interface file 76 to push data to portal container application 54. The set of methods added to callback object 72 become APIs 74 that applet interface file 76 can invoke when the applet is in the idle state. Example APIs could include 'ReadMessage' API and 'SendMessage' API. Thus, applet interface file 76 can run in the background without the entire applet being loaded, and can communicate with other entities outside of the iFrame in local network 20 by using selected APIs 74 made available by main page 60 of the user interface.

To illustrate example scenarios, certain APIs can be configured to communicate with smart network host device 30 in order to reach portal container application 54. In one example, an API exposed to an applet could allow the applet to notify portal container application 54 that the list of devices associated with the applet has been updated. Consequently, portal container application 54 can re-query smart network host device 30 for a related device list. In another example, an API exposed to an applet could enable the applet to notify portal container application 54 the current state of the application. Accordingly, portal container application 54 could update a badge (i.e., some text that modifies an application's icon to indicate the state of the corresponding application or device) on an icon associated with the corresponding device or application.

Figure 4:
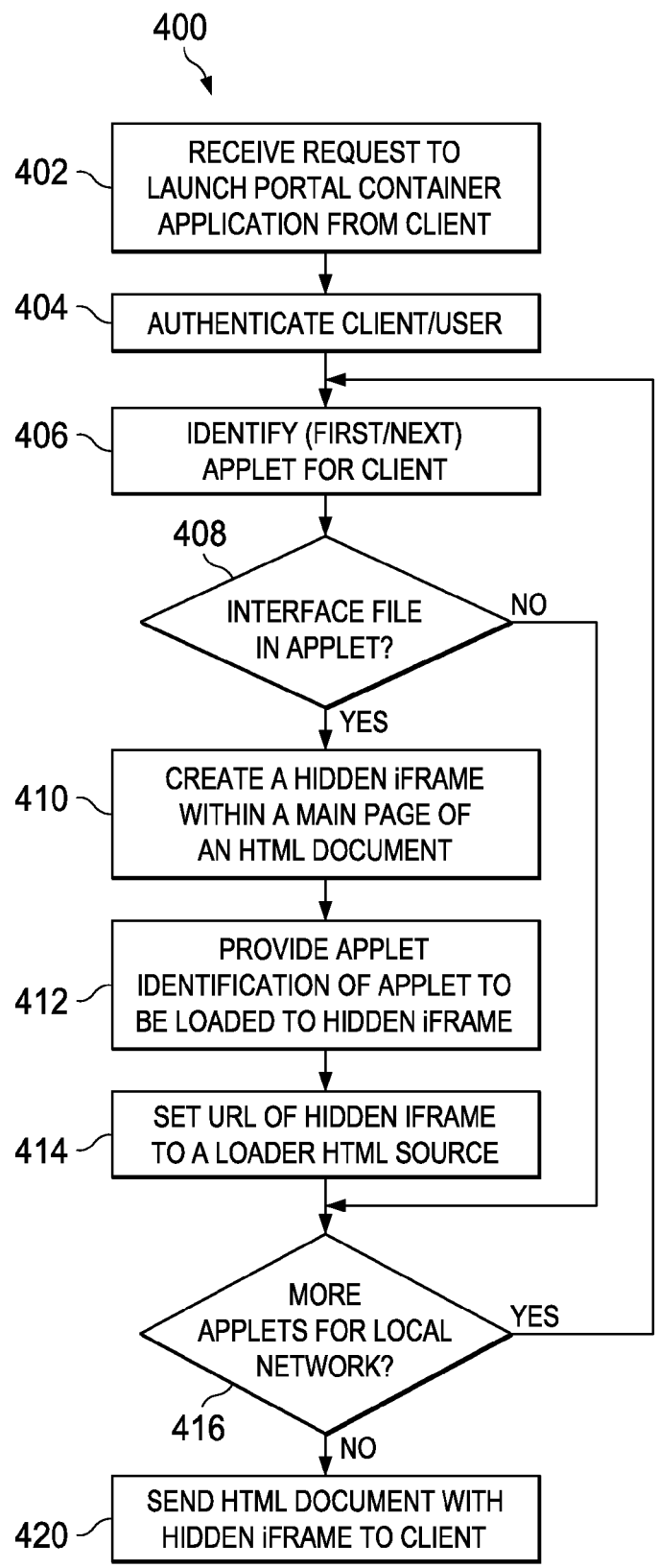
FIG. 4 is a simplified flowchart illustrating example operational steps that may be associated with embodiments of the system.

FIG. 4 is an example flowchart depicting a possible flow 100 for launching portal container application 54 to enable communication with an applet within a hidden iFrame. For ease of reference, operational steps shown in FIG. 4 are described with reference to elements of FIGS. 1-3. At 402, portal server 50 receives a request from computer 40 to launch portal container application 54. At 404, authentication and account module 56 can authenticate the computer 40 and/or a user using any suitable authentication techniques. If computer 40 has accessed portal server 50 from a remote network, then portal container application 54 establishes a connection to smart network host device 30. Authentication and account module 56 may also determine the particular computing devices associated with local network 20, to which computer 40 is connected. In one embodiment, module 56 can communicate with smart network host device 30 to obtain information from network state model 36 regarding the types of computing devices and other network elements configured in local network 20. Finally, authentication and account module 56 can determine which applets have been purchased for local network 20 (e.g., service applets purchased from third parties or from the provider of portal container application 54) and which free applets have been selected for local network 20. This determination can be made by accessing an account associated with the authenticated client and/or user.

Once the computing devices and network elements of local network 20 are known, and other selected applets (free or purchased) are known, at 406 applet identification module 57 can identify applets to be downloaded to local network 20. Applet identification module 57 can search applets 55 to identify applet identifiers (applet IDs) for each applet to download.

When a first applet is identified 408, portal container application 54 can examine the applet and determine whether it contains an applet interface file. If it does not contain an applet interface file, then flow proceeds to 416 and a determination is made as to whether there are more applets to be examined for local network 20. If there are more applets to be examined, then flow passes back to 406 to identify the next applet.

If an applet interface file is found at 408 in the currently identified applet, then flow proceeds to 410 where portal container application 54 creates a hidden iFrame within a main page of a parent container file (e.g., HTML document 58) by using <iFrame> tags. The iFrame can be configured to not display on computer 40 by using the 'DISPLAY:NONE' or 'VISIBILITY:HIDDEN' setting of CSS. At 412, the applet ID of the current applet to be loaded is provided to the hidden iFrame. In one example implementation, the applet ID is appended to the URL of an HTML source file (e.g., HTML source file 78) as an HTML query parameter. At 414, the URL of the iFrame can be set to the URL of the HTML source file, with the appended applet ID, which enables an HTML page to load into the hidden iFrame when web browser 44 interprets HTML source file 78.

After the URL of the iFrame has been set with the HTML source file URL and appended applet ID, then flow passes to 416, where a determination is made as to whether there are more applets to be examined for local network 20. If all of the applets have been examined, then flow proceeds to 420 where HTML document 58 is sent to computer 40.

Figure 5:
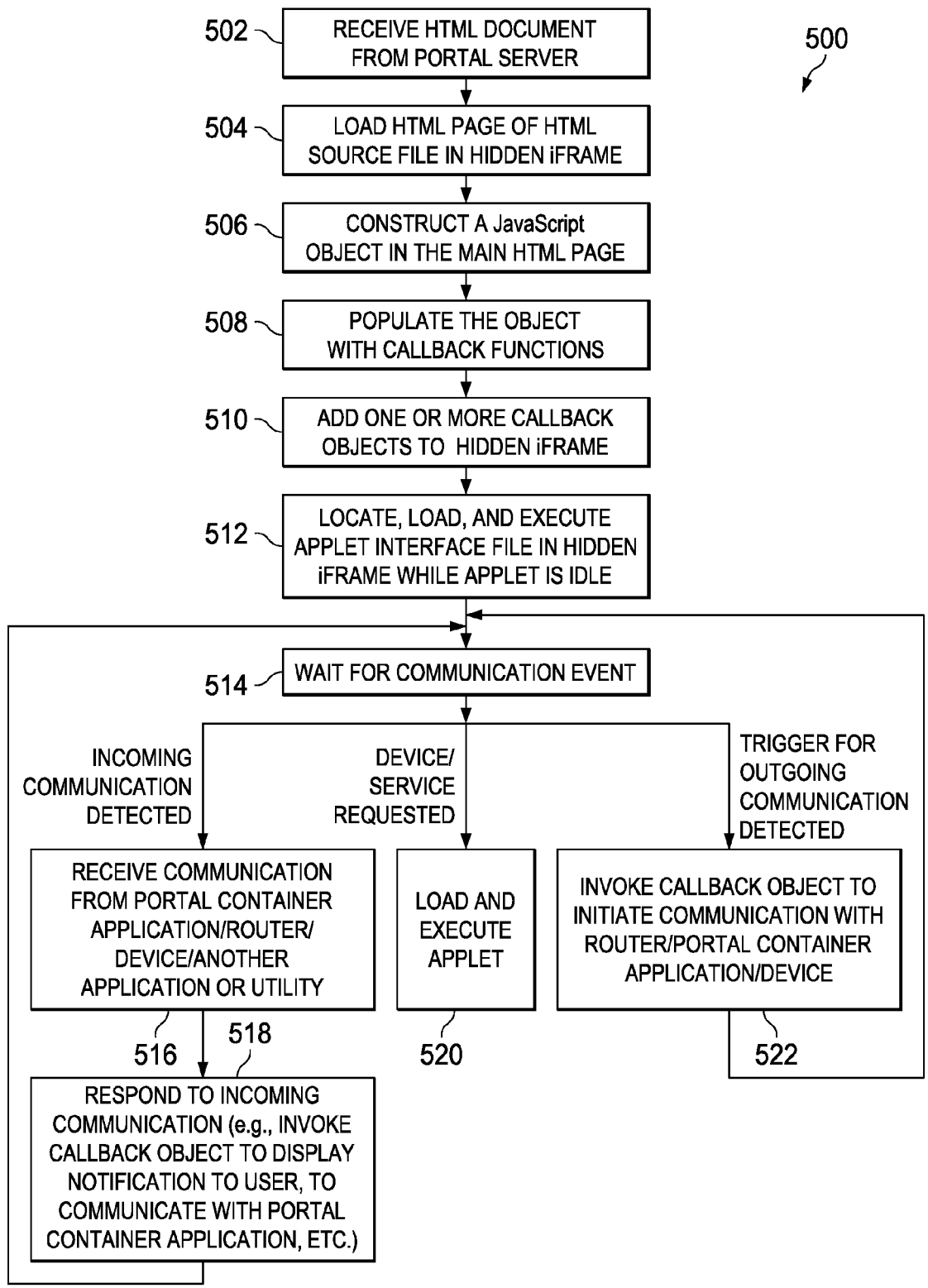
FIG. 5 is a simplified flowchart illustrating additional example operational steps that may be associated with embodiments of the system.

FIG. 5 is an example flowchart depicting a possible flow 500 for interpreting an HTML document and rendering a main HTML page with one or more hidden iFrames, each containing an applet that can communicate outside the iFrame. For ease of reference, operational steps shown in FIG. 5 will be described with reference to elements of FIGS. 1-3. At 502, computer 40 receives HTML document 58 from portal container application 54 in portal server 50. At 504, an HTML page of HTML source file 78 is loaded into hidden iFrame 70(1). At 506, a JavaScript object (e.g., callback object 62) is constructed in main page 60 and then populated with callback functions (e.g., APIs 64(1)-(*n*)) at 508. The At 510, callback object 72, corresponding to callback object 62 of main page 60, is then added to hidden iFrame 70(1).

After callback object 72, which contains APIs 74 divulged by main page 60, is added to hidden iFrame 70(1), applet interface file 76 of the applet associated with iFrame 70(1) is located, loaded, and executed in hidden iFrame 70(1) while the applet remains idle. In one embodiment, applet interface file 76 may continue to run in the background until a request is made to load the applet. For example, applet interface file for a printer applet may be loaded and running in a hidden iFrame to communicate with the printer and users concerning ink levels, paper supply, etc. When a user selects a print action for the printer, the printer applet may be loaded and, therefore, the applet interface file of the printer applet may no longer need to run in the background.

At 514, each applet interface file in each hidden iFrame 70(1) through **70(*n*)** can wait for a communication event while running in the background. A communication event can include detecting an incoming communication to the applet interface file, detecting a trigger to initiate outgoing communication, and detecting a request to load a corresponding device or service applet.

If an incoming communication is detected by applet interface file 76, then at 516, the communication is received from the associated entity sending the communication. The entity could include, for example, portal container application 54, smart network host device 30, a computing device in local network 20, or another application or utility. By way of illustration, a communication could be received by a chat utility from another user interested in chatting with the user of computer 40. Another exemplary communication could be received from a router (e.g., smart network host device 30) that another computing device (e.g., a child's Xbox) has come online in local network 20.

At 518, applet interface file 76 can invoke callback object 72 to access an appropriate API of APIs 74 to respond to the incoming communication. Examples of responses could include invoking callback object 72 to display an appropriate message to a user (e.g., 'User A is requesting a chat session', 'Xbox has joined the network', etc.). Once applet interface file responds to the incoming communication, it can continue to run in the background in hidden iFrame 70(1) and to wait for the next communication event at 514.

If a request is received to launch a device or service applet that is associated with applet interface file 76, then at 520, the requested applet can be loaded and executed. For example, if a user decided to launch a chat utility to begin a chat session with another user who requested a chat session, then the chat utility could be loaded and executed. Thus, allowing applet interface file 76 to continue running may be unnecessary while the chat utility is running. In this scenario in which applet interface file 76 was terminated when its corresponding applet was loaded, once the applet is exited (e.g., execution is terminated by a user exiting out of the applet), the applet may cease being visible to a user. Applet interface file 76 can then be loaded in the hidden iFrame again in order to receive and/or communicate events and notifications. In some implementations, however, applet interface file 76 can continue to run when its corresponding applet has been loaded and is executing. Furthermore, portal container application 54 may be configured to allow the user to 'hide' the applet so that it is no longer displayed and/or to prevent the applet interface file from running in the background.

If a trigger is detected by applet interface file 76 to initiate outgoing communications, then at 522, callback object 72 can be invoked to execute an appropriate one of APIs 74. Triggers can be time-based in some implementations. For example, applet interface file that is associated with a printer in the local network could periodically ping the printer using an appropriate API to determine whether the ink levels are satisfactory, whether the printer is out of paper, etc. After callback object 72 has been invoked to send an outgoing communication, applet interface file 76 can continue to run in the background in hidden iFrame 70(1) and to wait for the next communication event at 514.

In example implementations, at least some portions of the activities related to the system for communicating with an applet using an inline web frame in a network environment outlined herein may be implemented in software in, for example, portal container application 54, applets 55, authentication and account module 56, applet identification module 57, off-line portal container application 34, downloaded applets 35, and web browser 44. In some embodiments, this software could be received or downloaded from a web server or provided on computer-readable media in order to provide this system for communicating with an applet using an inline web frame. In some embodiments, one or more of these features may be implemented in hardware, provided external to these elements, or consolidated in any appropriate manner to achieve the intended functionality.

Furthermore, the embodiments of the system for communicating with applets described and shown herein may also include suitable interfaces for receiving, transmitting, and/or otherwise communicating data or information in a network environment such as network environment 10. Additionally, some of the processors and memory elements associated with the various network elements may be removed, or otherwise consolidated such that a single processor and a single memory location are responsible for certain activities. Alternatively, certain processing functions could be separated and separate processors and/or physical machines could implement various functionality. For example, portal server 50 could be separated into multiple machines to provide applet provider services 4, applet identification services 6, and portal container services 8. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., memory elements 32, 42, and 52) can store data used for the applet communication operations described herein. This includes the memory element being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processors 31, 41, and 51) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network environment 10 (e.g., smart network host device 30, computer 40, and portal server 50) may keep information in any suitable type of memory (e.g., random access memory (RAM), read-only memory (ROM), erasable programmable ROM (EPROM), electrically erasable programmable ROM (EEPROM), etc.), software, hardware, or in any other suitable component, device, element, or object where appropriate and based on particular needs. Any of the memory items discussed herein (e.g., memory elements 32, 42, 52) should be construed as being encompassed within the broad term 'memory element.' The information being read, used, tracked, sent, transmitted, communicated, or received by network environment 10 could be provided in any database, register, queue, table, cache, control list, or other storage structure, all of which can be referenced at any suitable timeframe. Any such storage options may be included within the broad term 'memory element' as used herein. Similarly, any of the potential processing elements, modules, and machines described in this Specification should be construed as being encompassed within the broad term 'processor.'

Not shown in the FIGURES is additional hardware that may be suitably coupled to processors 31, 41, and 51 and other components in the form of memory management units (MMU), additional symmetric multiprocessing (SMP) elements, physical memory, peripheral component interconnect (PCI) bus and corresponding bridges, small computer system interface (SCSI)/integrated drive electronics (IDE) elements, etc. The network elements of FIG. 2 (e.g., smart network host device 30, computer 40, and portal server 50) may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in the computing devices and network elements to appropriately manage the operation of the hardware components therein.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements (e.g., as in FIG. 2). It should be appreciated that the system for communicating with applets using an inline web frame, as shown in the FIGURES, and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method comprising:
   identifying an applet for a local network;
   determining whether the applet includes an interface file; and
   providing instructions in a parent container file if the applet is determined to include the interface file, wherein the instructions, when executed by a processor enable operations comprising:
   rendering an inline web frame within a main web page;
   loading a source file in the inline web frame; and
   adding a callback object to the inline web frame, wherein the source file is to load the interface file of the applet in the inline web frame, wherein the interface file is configured to invoke the callback object when the applet is idle to communicate with an entity associated with the local network.

2. The method of claim 1, wherein the entity includes at least one of a portal container application in a cloud network, and a smart network host device in the local network.

3. The method of claim 1, wherein the inline web frame is hidden in the main web page.

4. The method of claim 1, wherein the callback object contains one or more application programming interfaces (APIs).

5. The method of claim 1, further comprising:
   receiving a communication from the interface file;
   generating instructions to display a notification on at least one computing device connected to the local network; and
   communicating the instructions to the local network.

6. The method of claim 1, wherein the operations further comprise:
   adding the callback object to the main page before adding the callback object to the inline web frame; and
   populating the callback object in the main web page with application programming interfaces (APIs).

7. The method of claim 6, wherein the source file includes instructions to enable the loading of the interface file of the applet in the inline web frame.

8. The method of claim 3, wherein the operations further comprise:
   setting a global variable in the hidden inline web frame to the callback object in the main web page.

9. The method of claim 1, further comprising:
   setting a uniform resource locator (URL) of the inline web frame to a URL of the source file, wherein an applet identifier is appended to the URL as a query parameter.

10. The method of claim 9, wherein the source file uses the applet identifier to locate and load the interface file in the inline web frame.

11. The method of claim 1, wherein the parent container file and the source file are hypertext markup language (HTML) documents.

12. Logic encoded in non-transitory computer-readable media that includes code for execution and when executed by a processor is operable to perform operations comprising:
    identifying an applet for a local network;
    determining whether the applet includes an interface file; and
    providing instructions in a parent container file if the applet is determined to include the interface file, wherein the instructions, when executed enable operations comprising:
    rendering an inline web frame within a main web page;
    loading a source file in the inline web frame; and
    adding a callback object to the inline web frame, wherein the source file is to load the interface file of the applet in the inline web frame, wherein the interface file is configured to invoke the callback object when the applet is idle to communicate with an entity associated with the local network.

13. The logic of claim 12, wherein the callback object contains one or more application programming interfaces (APIs).

14. The logic of claim 12, wherein the interface file is configured to execute until a request to load the applet is received.

15. The logic of claim 12, wherein the main web page adds the callback object to the inline web frame by setting a global variable in the inline web frame to the callback object of the main web page.

16. The logic of claim 15, wherein the interface file is configured to invoke the callback object by using the global variable.

17. An apparatus, comprising:
    a memory element configured to store data;
    a processor operable to execute instructions associated with the data; and
    a portal container application configured to interface with the memory element and the processor, wherein the apparatus is configured to:
    identify an applet for a local network;
    determine whether the applet includes an interface file; and
    provide instructions in a parent container file if the applet is determined to include the interface file, wherein the instructions, when executed enable operations comprising:
    rendering an inline web frame within a main web page;
    loading a source file in the inline web frame; and
    adding a callback object to the inline web frame, wherein the source file is to load the interface file of the applet in the inline web frame, wherein the interface file is configured to invoke the callback object when the applet is idle to communicate with an entity associated with the local network.

18. The apparatus of claim 17, wherein the callback object contains one or more application programming interfaces (APIs).

19. The apparatus of claim 17, wherein the callback object is added to the inline web frame from the main web page.

20. The apparatus of claim 17, wherein the callback object is added to the inline web frame by setting a global variable in the inline web frame to the callback object of the main web page.

* * * * *